US007305617B2

(12) United States Patent
McCully

(10) Patent No.: US 7,305,617 B2
(45) Date of Patent: Dec. 4, 2007

(54) METHOD FOR ALIGNING TEXT TO BASELINE GRIDS AND TO CJK CHARACTER GRIDS

(75) Inventor: Nathaniel M. McCully, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 533 days.

(21) Appl. No.: 09/782,596

(22) Filed: Feb. 12, 2001

(65) Prior Publication Data

US 2004/0268255 A1    Dec. 30, 2004

Related U.S. Application Data

(60) Provisional application No. 60/182,130, filed on Feb. 12, 2000.

(51) Int. Cl.
*G06F 15/00* (2006.01)
*G00F 17/00* (2006.01)
*G09G 5/00* (2006.01)

(52) U.S. Cl. ............... 715/517; 715/523; 345/677; 345/672

(58) Field of Classification Search ........... 715/523, 715/531, 532, 513, 517; 345/677, 672
See application file for complete search history.

(56) References Cited

U.S. PATENT DOCUMENTS

| | | | |
|---|---|---|---|
| 4,251,799 A * | 2/1981 | Jih | ............... 382/174 |
| 4,284,975 A | 8/1981 | Odaka | |
| 4,291,381 A | 9/1981 | Siebeck | |
| 4,539,653 A | 9/1985 | Bartlett et al. | |
| 4,581,710 A * | 4/1986 | Hasselmeier | ............ 358/1.17 |

(Continued)

FOREIGN PATENT DOCUMENTS

JP    61-282974    12/1986

(Continued)

OTHER PUBLICATIONS

Church, Kenneth Ward, "Char_align: A Program for Aligning Parallel Texts at the Character Level", Proceedings on the 31st Annual Meeting on Associating for Computational Linguistics, Jun. 1993, pp. 1-8 (plus citation page).*

(Continued)

*Primary Examiner*—Cam-Y Truong
*Assistant Examiner*—Robert Stevens
(74) *Attorney, Agent, or Firm*—Fish & Richardson P.C.

(57) ABSTRACT

Methods and apparatus, including computer program products, implementing and using techniques for controlling forced grid line spacing. The height of text consisting of a plurality of characters to be arranged within a current line in a grid displayed on a display device is determined. If the height of the text is larger than a specified dimension for the grid, an arrangement region that includes the current line and at least one subsequent line is demarcated. A coordination line within the arrangement region according to a selected coordination mode is set and the plurality of characters is arranged within the arrangement region while coordinating the plurality of characters with the coordination line. This provides an electronic typesetting technology that can automatically and swiftly perform forced grid line spacing without requiring complicated manual operations by the user.

19 Claims, 9 Drawing Sheets

U.S. PATENT DOCUMENTS

| | | | |
|---|---|---|---|
| 4,591,999 A | | 5/1986 | Logan |
| 4,608,664 A | * | 8/1986 | Bartlett et al. ............... 358/1.2 |
| 4,755,955 A | * | 7/1988 | Kimura et al. ............. 715/521 |
| 4,833,627 A | | 5/1989 | Leszczynski |
| 4,850,025 A | * | 7/1989 | Abe ........................... 382/220 |
| 4,860,456 A | * | 8/1989 | Arnao ......................... 33/1 B |
| 4,891,770 A | * | 1/1990 | Hollett ....................... 345/441 |
| 4,893,257 A | * | 1/1990 | Dominguez et al. ....... 358/1.11 |
| 4,928,252 A | | 5/1990 | Gabbe et al. |
| 4,974,174 A | * | 11/1990 | Kleinman ................... 345/678 |
| 5,003,499 A | | 3/1991 | Fujiwara et al. |
| 5,016,000 A | * | 5/1991 | Bugg ...................... 345/472.2 |
| 5,018,083 A | | 5/1991 | Watanabe et al. |
| 5,068,809 A | * | 11/1991 | Verhelst et al. ............. 715/518 |
| 5,140,676 A | | 8/1992 | Langelaan |
| 5,175,806 A | | 12/1992 | Muskovitz et al. |
| 5,221,921 A | * | 6/1993 | Statt ........................... 345/471 |
| 5,245,676 A | * | 9/1993 | Spitz .......................... 382/235 |
| 5,287,443 A | | 2/1994 | Mameda et al. |
| 5,301,267 A | * | 4/1994 | Hassett et al. .............. 345/469 |
| 5,339,392 A | | 8/1994 | Risberg et al. |
| 5,399,029 A | | 3/1995 | Muraoka et al. |
| 5,416,898 A | | 5/1995 | Opstad et al. |
| 5,432,890 A | | 7/1995 | Watanabe |
| 5,434,961 A | | 7/1995 | Horiuchi et al. |
| 5,459,826 A | | 10/1995 | Archibald |
| 5,490,241 A | | 2/1996 | Mallgren et al. |
| 5,500,931 A | | 3/1996 | Sonnenschein |
| 5,501,538 A | | 3/1996 | Sawada et al. |
| 5,548,700 A | * | 8/1996 | Bagley et al. .............. 715/540 |
| 5,579,471 A | | 11/1996 | Barber et al. |
| 5,581,670 A | | 12/1996 | Bier et al. |
| 5,588,108 A | | 12/1996 | Kumar et al. |
| 5,617,115 A | | 4/1997 | Itoh et al. |
| 5,634,064 A | | 5/1997 | Warnock et al. |
| 5,636,132 A | | 6/1997 | Kamdar |
| 5,710,896 A | | 1/1998 | Seidl |
| 5,724,072 A | | 3/1998 | Freeman et al. |
| 5,724,596 A | | 3/1998 | Lathrop |
| 5,729,751 A | | 3/1998 | Schoolcraft |
| 5,734,915 A | | 3/1998 | Roewer |
| 5,740,456 A | | 4/1998 | Harel et al. |
| 5,778,403 A | | 7/1998 | Bangs |
| 5,802,532 A | | 9/1998 | Nakayama et al. |
| 5,803,629 A | * | 9/1998 | Neville et al. .............. 400/304 |
| 5,805,167 A | | 9/1998 | van Cruyningen |
| 5,809,166 A | | 9/1998 | Huang et al. |
| 5,845,299 A | | 12/1998 | Arora et al. |
| 5,852,447 A | * | 12/1998 | Hosoya et al. .............. 345/468 |
| 5,893,145 A | | 4/1999 | Thayer et al. |
| 5,911,145 A | | 6/1999 | Arora et al. |
| 5,923,329 A | | 7/1999 | Beale |
| 5,937,420 A | | 8/1999 | Karow et al. |
| 5,956,419 A | * | 9/1999 | Kopec et al. ............... 382/159 |
| 5,963,641 A | | 10/1999 | Crandall et al. |
| 5,999,649 A | * | 12/1999 | Nicholson et al. .......... 382/190 |
| RE36,704 E | | 5/2000 | Parker et al. |
| 6,088,520 A | | 7/2000 | Taoka et al. |
| 6,134,568 A | | 10/2000 | Tonkin |
| 6,161,116 A | | 12/2000 | Saltzman |
| 6,252,607 B1 | | 6/2001 | Babcock |
| 6,321,243 B1 | | 11/2001 | Ballard |
| 6,330,577 B1 | | 12/2001 | Kim |
| 6,359,630 B1 | | 3/2002 | Morse et al. |
| 6,426,751 B1 | | 7/2002 | Patel et al. |
| 6,434,579 B1 | | 8/2002 | Shaffer et al. |
| 6,448,964 B1 | | 9/2002 | Isaacs et al. |
| 6,496,600 B1 | * | 12/2002 | Huang ........................ 382/187 |
| 6,504,544 B1 | | 1/2003 | Hollingsworth et al. |
| 6,510,441 B1 | | 1/2003 | Kenninga |
| 6,613,099 B2 | | 9/2002 | Crim |
| 6,624,814 B1 | | 9/2003 | Karow et al. |
| 6,741,268 B1 | | 5/2004 | Hayakawa |
| 6,886,133 B2 | | 4/2005 | Bailey et al. |
| 6,928,611 B2 | | 8/2005 | McCully et al. |
| 2001/0048764 A1 | | 12/2001 | Betrisey et al. |
| 2002/0035697 A1 | | 3/2002 | McCurdy et al. |
| 2002/0062324 A1 | | 5/2002 | McCully et al. |
| 2003/0229856 A1 | | 12/2003 | McCully |

FOREIGN PATENT DOCUMENTS

| | | |
|---|---|---|
| JP | 1-125656 | 5/1989 |
| JP | 1-271275 | 10/1989 |
| JP | 02-213983 | 8/1990 |
| JP | 4-52871 | 2/1992 |
| JP | 05-224651 | 9/1993 |
| JP | 06-20026 | 1/1994 |
| JP | 06-96174 | 4/1994 |
| JP | 06-149806 | 5/1994 |
| JP | 07-096594 | 4/1995 |
| JP | 07-149005 | 6/1995 |
| JP | 7-182303 | 7/1995 |
| JP | 8-137871 | 5/1996 |
| JP | 8-161309 | 6/1996 |
| JP | 8-194832 | 7/1996 |
| JP | 08-314655 | 11/1996 |
| JP | 10-069477 | 3/1998 |
| JP | 10-222499 | 8/1998 |
| JP | 11-102446 | 4/1999 |
| JP | 11-353491 | 12/1999 |
| JP | 2000-267645 | 9/2000 |
| JP | 2001-281835 | 10/2001 |
| JP | 2001-297077 | 10/2001 |
| JP | 2003-523015 | 7/2003 |

OTHER PUBLICATIONS

U.S. Appl. No. 09/964,293, filed Sep. 25, 2001, Shade et al.

Hirschberg, D.S. et al., "New Applications of Failure Functions", *Journal of the Association for Computing Machinery*, vol. 34, No. 3, Jul. 1987, pp. 616-625.

Peter Karow, "Extending Control of Digital Typography", Visible Language, 32.2, Visible Language 1998, pp. 100-127 (671001 IDS Sep. 30, 2004).

Courter, et al. "Mastering Microsoft Office 2000 Professional Edition", Sybex, Inc., Apr. 1999, pp. 24, 959, 962, 964.

Newton "Inside Generic CADD", New Riders Publishing, 1991, pp. 17, 76, 78.

Microsoft, Screen Shots from Microsoft Word 2000, copyright circa 1999, Figs. 1-16.

Adobe, "Lesson 8.2: Layout Grids", Adobe Web Tech Curriculum, data unknown, http://www.adobe.com/education/webtech/unit_site_dev2/lg_print.htm downloaded Jan. 3, 2006, 10 pages.

Arah, "Layout Grids—On the Grid, The Importance of Good Grid Handling", Nov. 1997, http://www.designer-info.com/DTP/dtp_grids.htm downloaded Jan. 3, 2006.

Finkelstein, "Precision Layout Creates Clear and Professional Design", data unknown, http://printthis.clickability.com/ downloaded Jan. 3, 2006.

Gross, "Grids in Design and CAD", 1991, Proc. Of Assn. for CAD in Architecture, LA, 11 pages.

Microsoft, "Microsoft Word Manual", Copyright 1993-1994 Microsoft Pages.

Microsoft, "Structure Your Publication Design using Layout Guides", Microsoft, 8 pages, downloaded Jan. 3, 2006.

Pagestream, "guides and the Grid", date unknown, http://www.grasshopperlle.com/help/PGSuser/guidegrid.html, downloaded Jan. 3, 2006.

\* cited by examiner

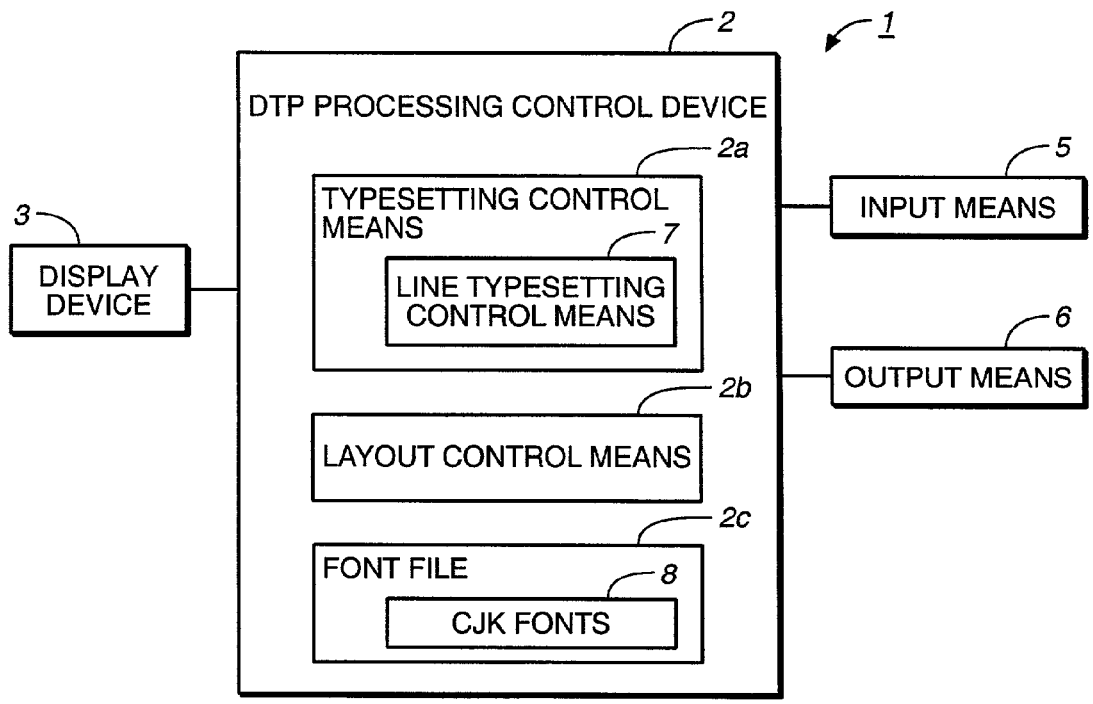
FIG._1
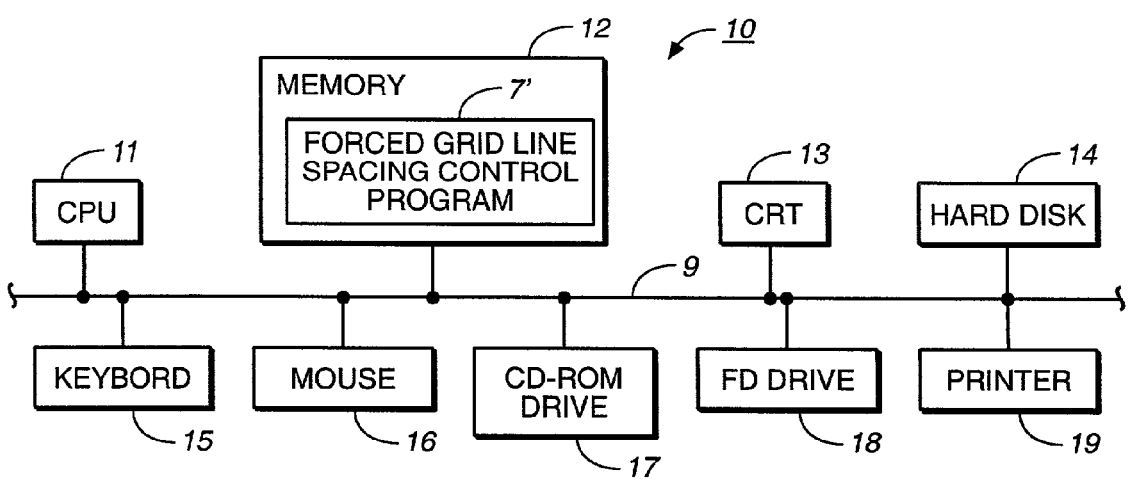
FIG._2

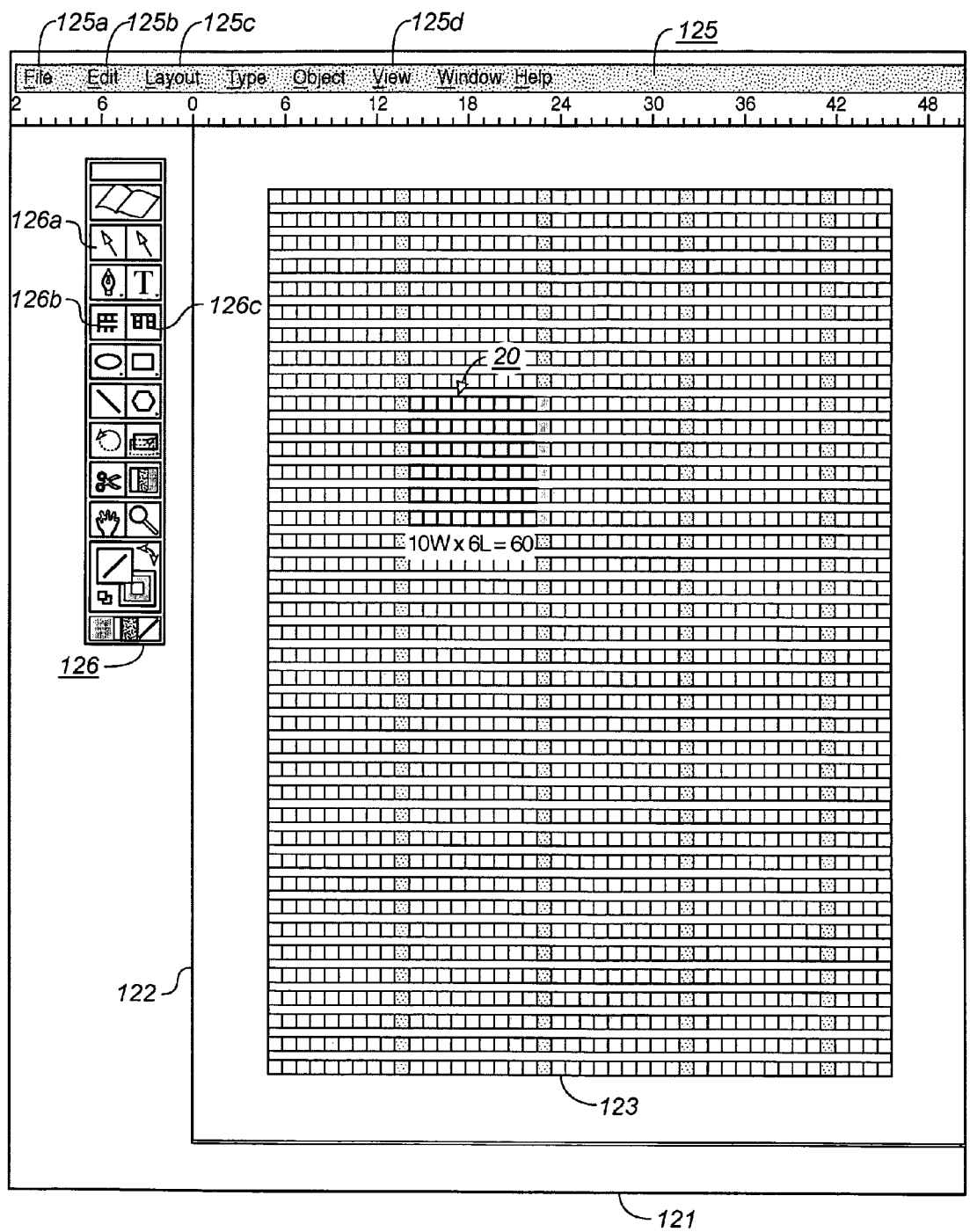
FIG._3

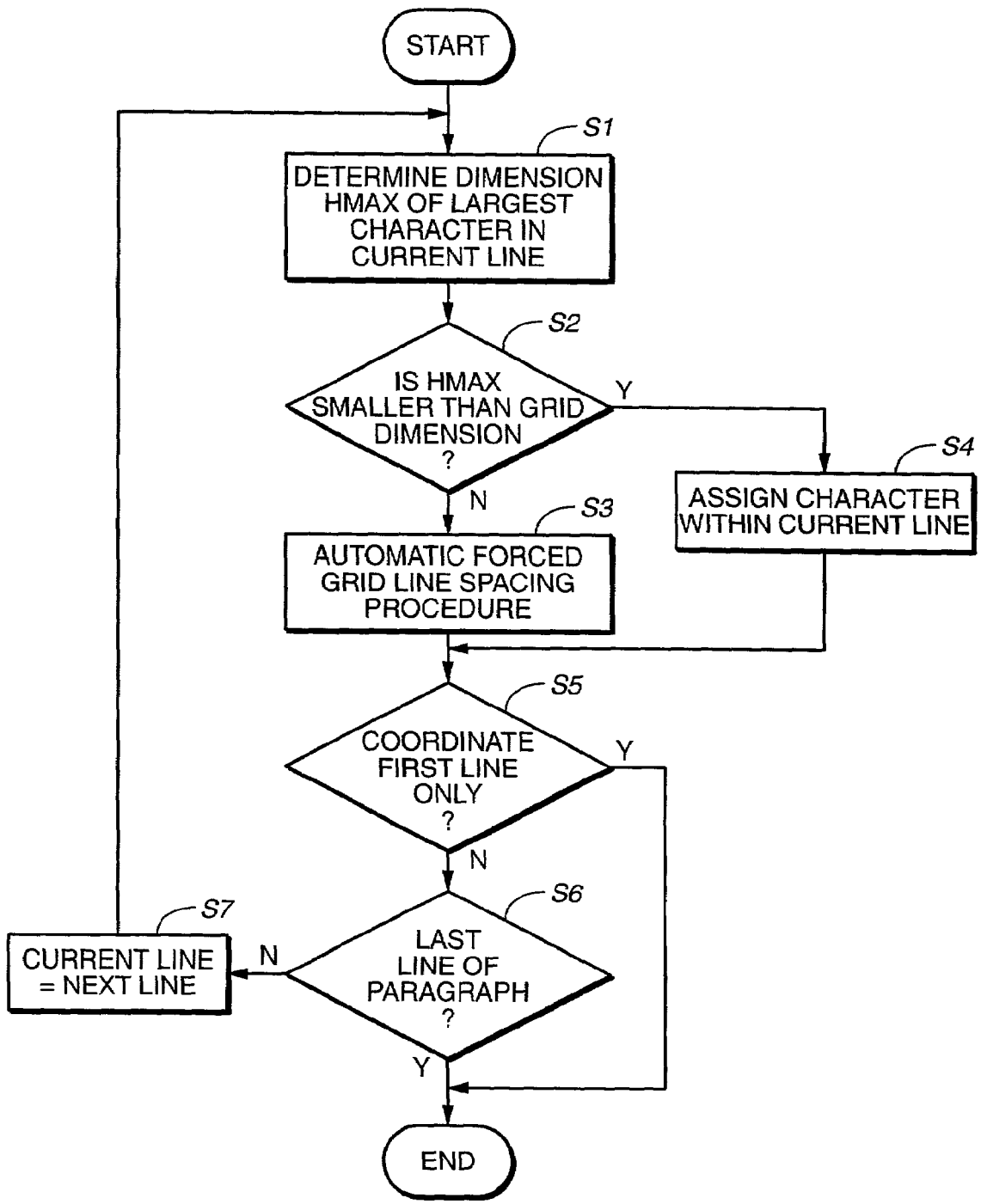
FIG._4

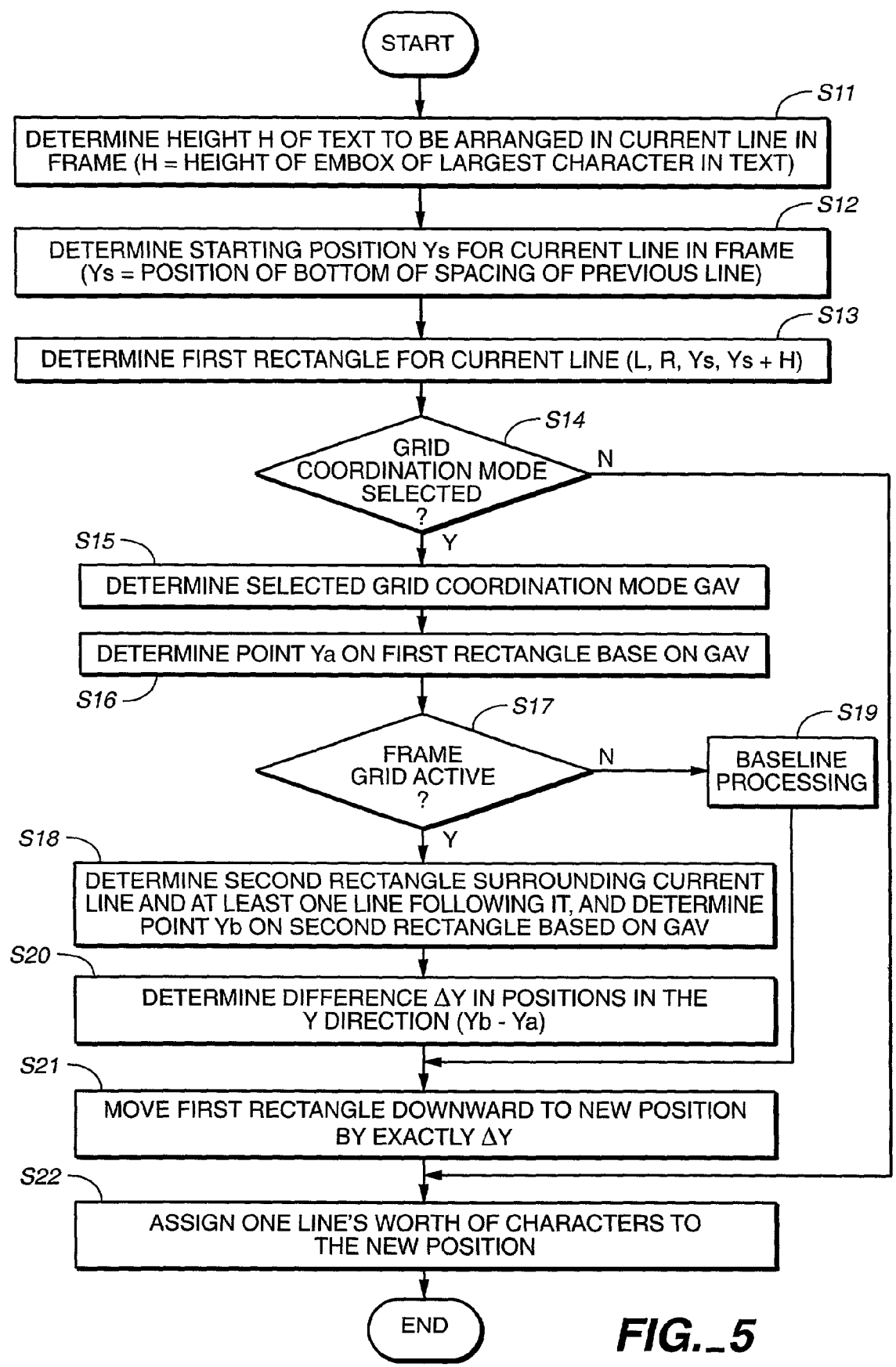
FIG._5

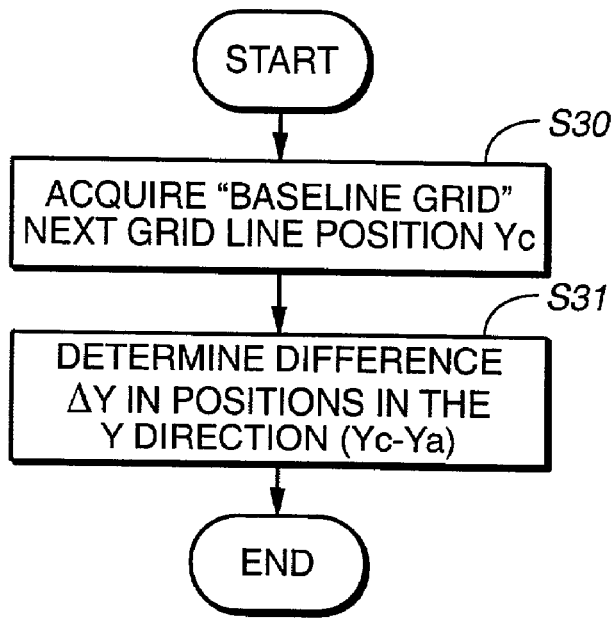
FIG._6
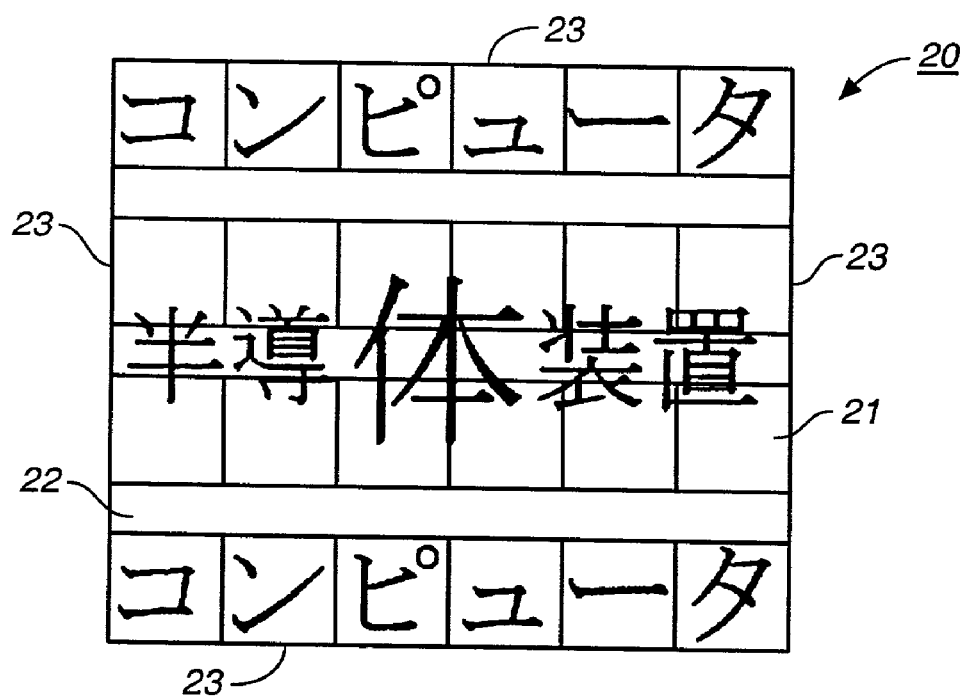
FIG._10

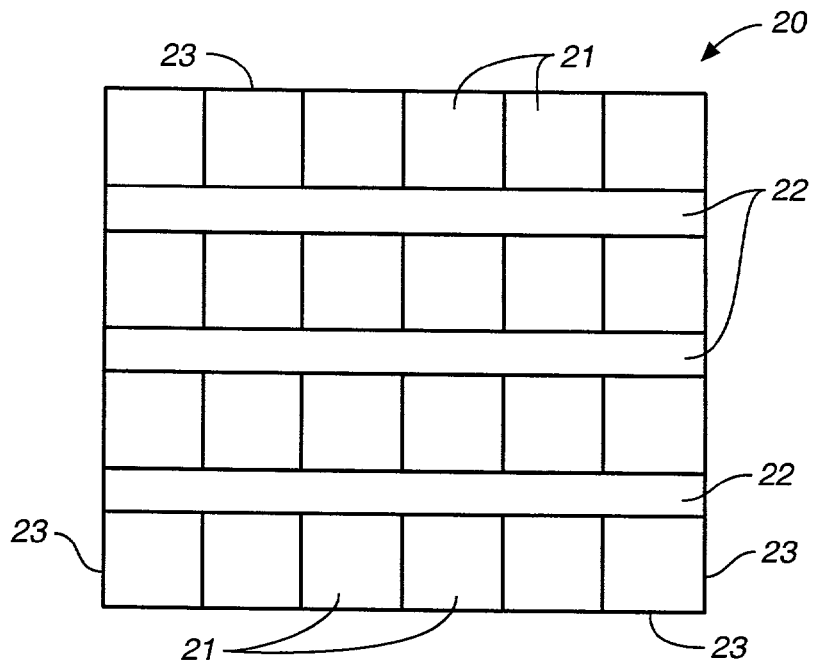
FIG._7A
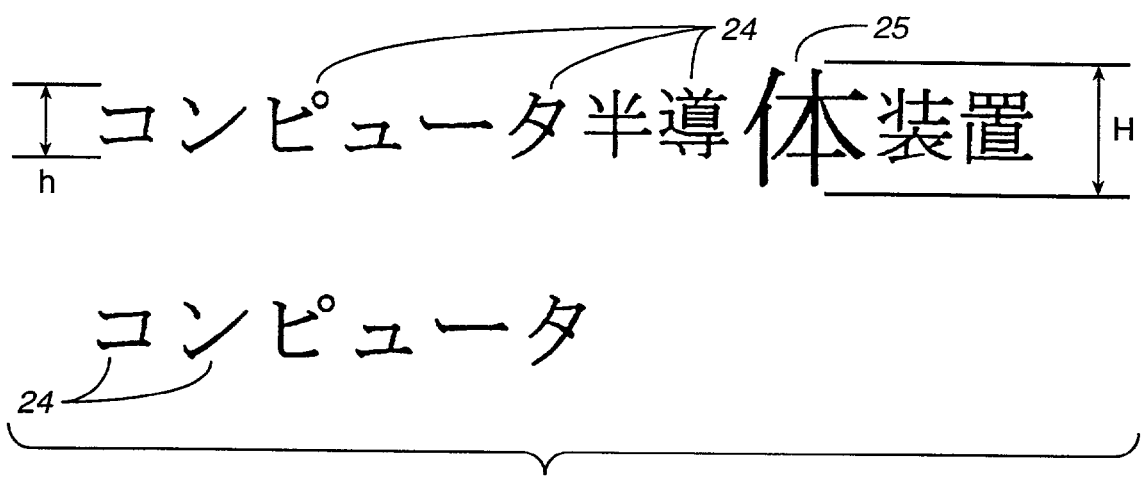
FIG._7B

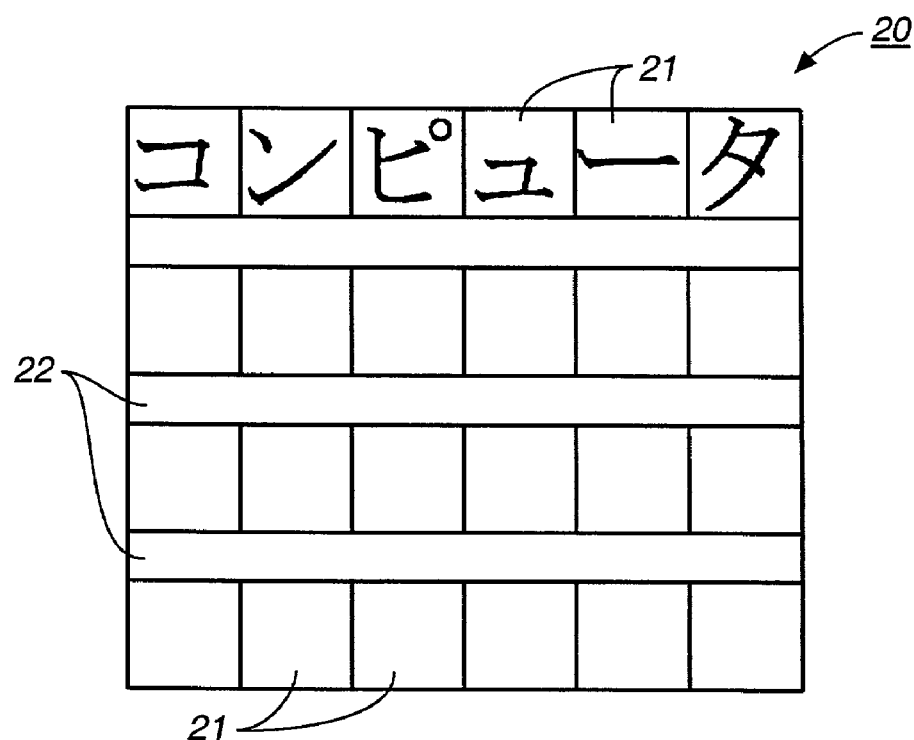
FIG._8A
FIG._8B

FIG._9A
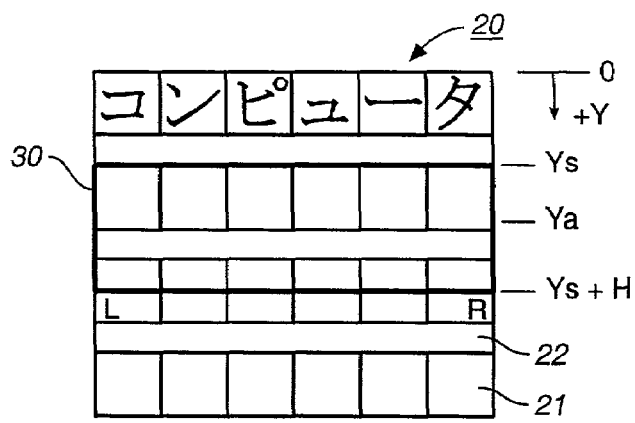
FIG._9B
FIG._9C
FIG._9D
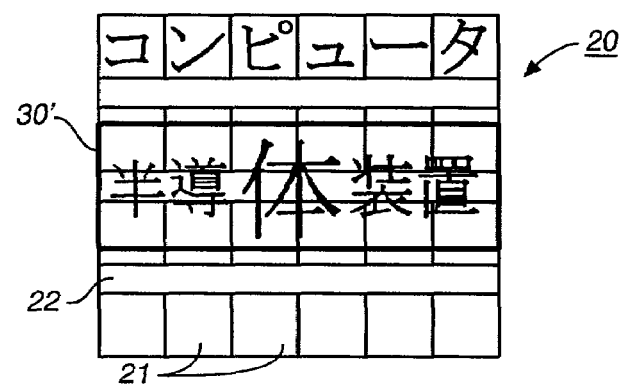

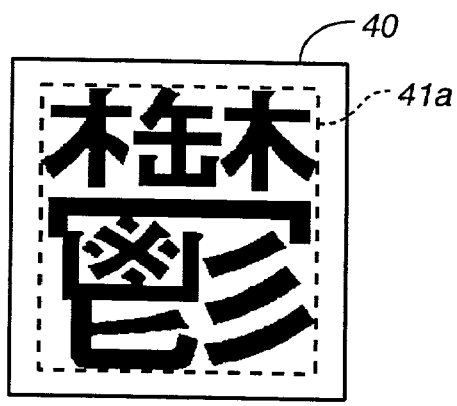
FIG._11A
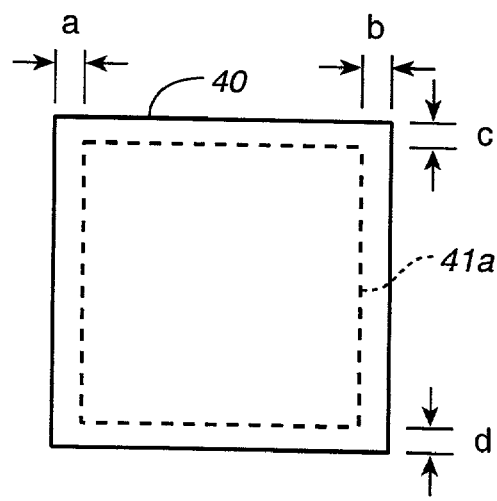
FIG._11B
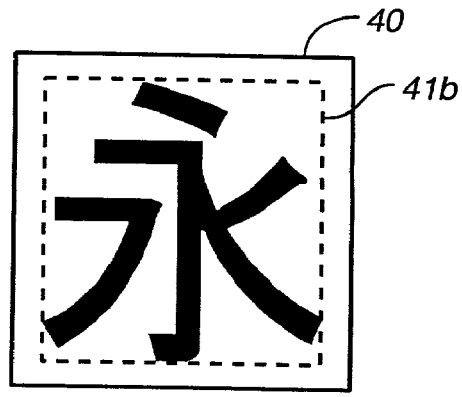
FIG._11C

METHOD FOR ALIGNING TEXT TO BASELINE GRIDS AND TO CJK CHARACTER GRIDS

CROSS-REFERENCE TO RELATED APPLICATIONS

This application claims the benefit of priority from U.S. Provisional Application No. 60/182,130.

This application claims benefit of priority under USC §119(e) to U.S. Provisional Patent Application No. 60/182, 130, entitled "Method For Aligning Text To Baseline Grids And To CJK Character Grids" by Nathaniel M. McCully, filed Feb. 12, 2000.

TECHNICAL FIELD

This invention relates to desktop publishing (DTP) technology, and more particularly to forced grid line spacing control in DTP.

BACKGROUND

When performing character typesetting on one page of an electronic document in DTP, a plurality of reference lines known as a grid is usually arranged on the page displayed on the display device, and characters are arranged with this grid as a reference. This grid defines a plurality of lines separated by a fixed interval, and typesetting is performed by sequentially arranging characters within these lines. Therefore, the size of the characters to be arranged within each line is restricted to a specified dimension, and when this specified dimension is exceeded, characters in adjacent lines may overlap. When the height of text consisting of a plurality of characters to be arranged within one line of the grid exceeds that line's specified dimension, so-called "forced grid line spacing" is performed to arrange these characters within an enlarged space that includes that line and an adjacent line. Forced grid line spacing selects the required number of adjacent lines according to character size, etc., defines an enlarged space by taking two or three lines, and arranges characters within that enlarged space.

However, in conventional DTP for electronic typesetting, either a special setting value must be input when performing forced grid line spacing, or it is necessary to perform forced grid line spacing by manually moving characters displayed on a display device. In addition, when text consists of a plurality of characters with differing fonts or dimensions, doing forced grid line spacing becomes very difficult, and requires much time and effort.

SUMMARY

In general, in one aspect, the invention provides methods and apparatus, including computer program products, implementing and using techniques for controlling forced grid line spacing. The height of text consisting of characters to be arranged within a current line in a grid displayed on a display device is determined. An arrangement region that includes the current line and at least one subsequent line if the height of the text is larger than a specified dimension for the grid is demarcated. A coordination line within the arrangement region according to a selected coordination mode is set and the characters are arranged within the arrangement region while coordinating the plurality of characters with the coordination line.

Implementations can include one or more of the following features. The grid may be a frame grid that is movable to a desired position on a page of an electronic document displayed on the display device in order to arrange data to be typeset on the page, and may have lines including cells. The grid can be a CJK character grid. The specified dimension of the grid may be a font point dimension that is selected when the grid is created by the user on the display device. The coordination mode may include a top coordination mode, a midpoint coordination mode, a baseline coordination mode, and a bottom coordination mode. Each character may have an associated embox and the maximum dimension of the current line may be the dimension of the largest embox associated with the plurality of characters. The embox may vertically and horizontally delimit the point dimensions of each character and can be an essentially square frame surrounding the character glyph.

Potential advantages of the invention may include one or more of the following. The invention may enable completely automated forced grid line spacing, and may make it possible to perform typesetting operations efficiently by computer processing without the necessity of complicated manual operations, even when the text to be typeset includes characters with differing dimensions. In addition, the invention may make it possible to select a wide variety of forced grid line spacing configurations as options, and may make it possible to do typesetting with much fine detail and variety by computer.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1 is a schematic block diagram showing a DTP system capable of controlling forced grid line spacing in accordance with one implementation of the invention.

FIG. 2 is a schematic block diagram showing a DTP system capable of controlling forced grid line spacing in accordance with another implementation of the invention.

FIG. 3 is a schematic diagram showing an example of the display on the screen of a display device when performing typesetting in accordance with one implementation of the invention.

FIG. 4 is a flowchart showing the overall processing procedure for performing typesetting in accordance with one implementation of the invention.

FIG. 5 is a flowchart showing the processing flow for automatically performing forced grid line spacing in accordance with one implementation of the invention.

FIG. 6 is a flowchart showing the processing flow when branching to baseline processing based on the decision result in step S17 in FIG. 5.

FIG. 7A is a schematic diagram showing one example a frame provided with a grid based on CJK characters.

FIG. 7B is a schematic diagram showing text consisting of a plurality of CJK characters with differing dimensions to be arranged within a frame.

FIG. 8A is a schematic diagram showing the situation when the initial characters of the text are arranged within a frame.

FIG. 8B is a schematic diagram showing the remaining text to be arranged within a frame.

FIG. 9A-D are schematic diagrams showing the sequence of states when performing forced grid line spacing (taking two lines) in accordance with one implementation of the invention.

FIG. 10 is a schematic diagram showing the state when all of the text is arranged within a frame.

FIG. 11A-C are schematic diagrams for explaining the embox and the ICF box concepts.

Like reference symbols in the various drawings indicate like elements.

DETAILED DESCRIPTION

The following explanation deals mainly with horizontal typesetting, but it should be noted that the forced grid line spacing control technique described below can be applied to both horizontal typesetting and to vertical typesetting.

FIG. 1 shows an electronic typesetting DTP system 1 in accordance with on one implementation of the invention. DTP processing system 1 has a DTP processing control device 2, which can perform electronic typesetting and layout editing and so forth; a display device 3 for displaying the data being processed; an input means 5 for inputting various types of data such as graphics, text, control instructions, etc.; and an output means 6 for outputting processed data. DTP processing control device 2 has typesetting control means 2a, which controls typesetting, layout control means 2b, which controls layout editing, and font file 2c, which stores font information on attributes of the text to be output on a display or printed, etc. In particular, font file 2c includes CJK fonts 8, which are fonts for ideographic characters such as Japanese, Chinese, Korean, etc. In addition, typesetting control means 2a has forced grid line spacing control means 7, which controls forced grid line spacing when arranging a plurality of characters that are being typeset in electronic typesetting within a grid displayed on the display device.

Display device 3 can comprise various types of display devices such as a CRT or an LCD, etc. Input means 5 can include a keyboard, pointing device (mouse, track ball, track point, etc.), scanner, communication interface, etc. In addition, output means 6 can comprise a printer, external memory device, etc. DTP processing control device 2 can comprise a processor such as a CPU, etc., a memory or an electronic typesetting processing program, etc. that includes a line typesetting control routine that is loaded into memory and processed by a processor. DTP processing control device 2 can alternatively be constituted in part or in whole as hardware constituted as firmware.

FIG. 2 is a block diagram showing a DTP system 10 provided with the inventive forced grid line spacing control function, constituted by applying the invention to a general-purpose computer system. System 10 shown in FIG. 2 has a CPU 11, a memory 12, a CRT 13, a hard disk 14, a keyboard 15, a mouse 16, a CD-ROM drive 17, a FD drive 18, and a printer 19. These units are coupled and work together via a bus 9. In electronic typesetting based on invention, a forced grid line spacing control program 7' is, for example, a routine with other electronic typesetting programs and is, for example, installed in system 10 via CD-ROM drive 17 or FD drive 18, and stored on hard disk 14. Font file 2c can also be stored on hard disk 14. When the forced grid line spacing control program 7' or an electronic typesetting program containing the forced grid line spacing control program is started by a user operating keyboard 15 or mouse 16, the forced grid line spacing control program is loaded into memory 12 as shown in the diagram. Therefore, forced grid line spacing control means 7 be constituted as CPU 11 and forced grid line spacing control program 7' loaded into memory 12. Therefore, in one aspect the invention comprises a computer-readable recording medium (for example, CD-ROM, FD, tape, semiconductor memory, etc.) storing a forced grid line spacing control program so that a general-purpose computer system can be converted into a DTP system providing the inventive forced grid line spacing control function.

FIG. 3 shows part of the screen of the display device 3 in FIG. 1, which can be CRT 13 in FIG. 2, for example. Electronic document 122 is displayed on screen 121 as an editing form, and layout editing and typesetting editing of various page structural elements are performed thereon. Electronic document 122 can be displayed on screen 121 by clicking with a mouse on "File" 125a, in menu bar 125 that is displayed along the top of screen 121, and selecting "new document". When electronic document 122 is displayed on screen 121, a page grid (also known as a layout grid) 123 is displayed on electronic document 122 based on values set by questions to the user in a dialog box or as preset defaults. Page grid 123 comprises reference lines for arranging various types of objects, such as graphics or characters, within the electronic document. In the example shown here, page grid 123 is formatted as a manuscript form for horizontal writing, but grids with various other formats exist, such as manuscript forms for vertical writing, graph paper format, etc. Page grid 123 usually has a plurality of horizontal lines and a plurality of vertical lines, and also has a plurality of attraction points. Page grid 123's display/nondisplay on electronic document 122 can be controlled by clicking "View" 125d in menu bar 125 and making a pulldown menu appear, and selecting "grid display" or "grid nondisplay" therein. Furthermore, page grid 123's attraction function can be used regardless of display or nondisplay.

In addition, in FIG. 3 frame 20, which is one of the page structural elements (also known as objects), is arranged in electronic document 122. In particular, frame 20 is a text frame that has a CJK character grid, and has the same format (in this case, as a manuscript form for horizontal writing) and dimensions as page grid 123. Frame 20 is created by the user by using a mouse, for example, and clicking on grid creation tool 126b for manuscript forms for horizontal writing in toolbox 126, and then dragging the mouse along a diagonal across the desired length of screen 121. The default is to create the grid inside frame 20 identical to page grid 123. Furthermore, immediately after frame 20 is created, frame 20 may not be coordinated with the position of the page grid, but in this case the position of frame 20 can be coordinated by selecting frame 20 with selection tool 126a, for example, moving the frame by dragging with the mouse, and selectively attaching (also known as snapping) the frame to a plurality of attraction points provided on the page grid.

Tool box 126 also has grid creation tool 126c for manuscript forms formatted for vertical writing, and selection tool 126a for selecting objects displayed on screen 121, and various other known editing tools. In addition, menu bar 125 also contains functions for performing common editing tasks such as copying and pasting, and functions for setting spacing and so forth under "Edit" 125b.

FIG. 4 is a flowchart showing the typesetting control procedure in accordance with one implementation of the invention. This implementation shows the procedure of processing the typesetting processing of electronic document 122 displayed on screen 121 of a display device, as shown in FIG. 3 for example. Page grid 123 is set on electronic document 122 in order to do typesetting processing in electronic document 122, and text frame 20 with specified dimensions is created on page grid 123 by the user clicking on the horizontal writing grid tool 126*b* with the mouse and dragging the tool diagonally across screen 121. Furthermore, text frame 20's default is to have a grid with the same format and dimensions as page grid 123. In the example shown in the drawing, the grid of frame 20 has a plurality of lines extending horizontally, and each line has a plurality of cells. Preferably, each cell has an essentially square box shape determined by the dimensions of the characters (for example, their point dimension) that were set when frame 20 was created. In one implementation each cell can be set to a size that matches CJK character dimensions. In addition, the interline spacing, that is, spacing between two adjacent lines, is set.

Characters input by the user with a keyboard can be arranged inside frame 20, and text from a file already created by a word processor, for example, can be arranged inside frame 20 by flowing the text in. In this case, the characters arranged inside frame 20 in one implementation are first arranged in sequence on the uppermost line from left to right, and then similarly arranged in sequence from left to right on the second line from the top. Then one character is arranged inside each cell within each line, and in this implementation each character is arranged within each cell using a preselected coordination mode. For example, coordination modes may include a top coordination mode, a midpoint coordination mode, a baseline coordination mode, and a bottom coordination mode, etc. based on an "embox". There is also a top coordination mode, a midpoint coordination mode, and a bottom coordination mode, etc. based on an "ICF box".

An "embox" is an outer frame around a character, whose vertical and horizontal dimensions are set by the character's dimensions (for example, the character's point dimensions), and essentially corresponds to a so-called "imaginary body". The embox for a 12-point character in a certain font is an essentially square frame whose horizontal dimensions are 12 points and whose vertical dimensions are 12 points, surrounding the character's glyph. FIG. 11 shows one example of an embox. In FIG. 11A, square frame 40 surrounding the outermost sides of the glyph for the character "utsu" is this character's embox. Consequently, an embox can easily be determined if a character's dimensions are known.

On the other hand, an ICF box (ideographic character face) can be simply described as a character's averaged bounding box. That is, a character has a glyph representing the character portion, and the bounding box is the box surrounding the glyph, formed by the pair of horizontal lines touching the glyph's top and bottom parts and the pair of vertical lines touching positions at the farthest left and farthest right sides of the glyph. An average bounding box obtained by averaging the bounding boxes for one typical character or a plurality of characters in certain fonts (particularly CJK fonts) is called an ICF box. That is, in the example shown in FIG. 11, the embox of CJK character "utsu" in FIG. 11A is outer frame 40, and inner frame 41*a*, which touches the character and surrounds it, is the bounding box. Then, as shown in FIG. 11B for example, differences a, b, c, and d between embox 40 and bounding box 41*a* on the top, bottom, left, and right are determined, and the average of these is found, and the averaged bounding box formed inside the embox based on this average value is the ICF box. In another method, FIG. 11C shows embox 40 and bounding box 41*b* for the CJK character "naga". Then the differences between embox 40 and bounding box 41 for both characters "utsu" and "naga" are added. The result is averaged to determine the average value for the difference, and the ICF box can be determined based on this average value. In addition, instead of adding all of the top and bottom and left and right differences for a single character and determining the average value, it is also possible to calculate the average value for the left and right differences and the average value for the top and bottom differences separately, and determine an ICF box based on these respective average values. Furthermore, in this case there are instances in which the ICF box is not a perfect square, but by using a character that is essentially square itself, such as "utsu", it is possible to demarcate an ICF box that is essentially square.

As described above, it is possible to determine each character's embox and ICF box, so that the arranging of characters in the individual cells of the grid in frame 20 can be based on the emboxes or ICF boxes. For example, if the grid of frame 20 is created based on emboxes, characters are arranged based on emboxes, while if the grid is created based on ICF boxes characters are arranged based on ICF boxes. When the arrangement is based on emboxes, typically any of the embox's top part (top side), midpoint, baseline, or bottom part (bottom side) are used. On the other hand, if the arrangement is based on ICF boxes, typically any of the ICF boxes' top part (top side), midpoint, or bottom part (bottom side) are used. Furthermore, the example described above is horizontal typesetting processing. In vertical typesetting of course the left and right sides of the emboxes or the left and right sides of the ICF boxes can be used. Therefore, when the coordination mode is based on the top part of an embox, for example, the tops of the emboxes of characters to be arranged are arranged in coordination with the tops of lines (i.e. cells) to be arranged within the grid of frame 20. On the other hand, if the coordination mode is the midpoint of the embox, the midpoints (i.e. centers) of the characters to be arranged are arranged in coordination with the midpoints (centers) of lines (cells) to be arranged within the grid of frame 20.

Next, to explain the inventive processing procedure with reference to FIG. 4, first the process determines hmax, the dimension of the largest character in text consisting of a plurality of characters to be arranged in the current line in frame 20 (step S1). Next, the process decides whether or not the maximum dimension hmax is smaller than the grid dimension (line height or cell dimension) of frame 20 (step S2). If the decision result in step S2 is negative, an automatic forced grid line spacing procedure based on one implementation of the invention is executed (step S3), while if the result is affirmative the plurality of characters can be accommodated as is in frame 20's grid, so they are arranged in the line corresponding to the current line of frame 20, and the automatic forced grid line spacing procedure is skipped.

Next, the procedure in FIG. 4 moves to step S5, where a decision is made whether or not what is to be coordinated with frame 20's grid is only the first line of one paragraph. If the decision result is affirmative, the procedure immediately ends. On the other hand, if the decision result is negative, the flow moves to the next step, S6, where a decision is made whether or not the current line is the last line of the relevant paragraph. If the current line isn't the last line, the flow branches to step S7, where the next line in the paragraph is set as the current line and the flow returns to step S1. On the other hand, if the decision result in step S6 is affirmative, the procedure ends.

FIGS. 5 and 6 show one implementation of the automatic forced grid line spacing control procedure executed in step S3 in the main procedure of the invention described above.

In addition, FIGS. 7 through 10 show how a plurality of characters is arranged in frame 20 when performing processing in accordance with one implementation of the invention. Therefore the flow of processing in accordance with one implementation of the invention will be explained in detail with reference to the flowcharts of FIGS. 4 through 6 and to the schematic diagrams of FIGS. 7 through 10 simultaneously.

First, as shown in FIG. 7A, frame 20 having a manuscript writing grid with a horizontal writing format is prepared in this implementation. Frame 20 has four lines, and each line has six cells 21. Spacing 22 (interline spacing) is set between pairs of adjacent lines. The four boundaries that are formed by a pair of horizontal lines and pair of vertical lines in frame 20 match the boundaries of an internal cell 21. FIG. 7B shows text data (i.e. "computer semiconductor device computer") consisting of a series of characters to be arranged in frame 20 in FIG. 7A; this text data forms one paragraph. This text data is created in advance by a word processor, etc., and stored as a file in a memory device such as a hard disk, etc. As shown in FIG. 11B, this text data is characters of the same CJK font, and with the exception of character 25 (i.e. "tai"), all of the other characters 24 have the same dimension (point dimension) (height h). Only character 25 has a dimension (height H) larger than the other characters 24. Here, each cell 21 in frame 20 has a coordination mode based on the embox midpoint, so when arranging text data in frame 20 it is assumed that the text is arranged so that the midpoint (center point) of each character's embox is coordinated with the midpoint of the corresponding line (cell 21) of frame 20. Also, it is assumed that the dimensions of small characters 24 in the text data are the same as the dimensions of frame 20's cell 21. In addition, all paragraphs comprising text data in FIG. 7B are arranged in coordination with the grid of frame 20.

Therefore, when arranging the text data of FIG. 7B in frame 20 in FIG. 7A, first, the initial six characters (i.e. "computer") in the text data are selected as the current line, and the dimension hmax of the largest character in this current line is determined (step S1). In this case all of the characters 24 in the current line have the same size (i.e. hmax=h), and this size is the same as the grid (cell) dimension of frame 20, so the flow branches to step S4, and as shown in FIG. 8 these six characters 24 are individually arranged in six cells 21 in the first line of frame 20. In this implementation the entire paragraph is coordinated with the grid of frame 20, so the flow branches to step S7 where the next six characters are set as the current line, and then the flow returns to step S1, and processing begins for the next six characters (i.e. "semiconductor device") in this paragraph.

However, character 25 is included in the current line, and character 25 is larger than the other characters 24, and it is determined that dimension hmax of the largest character in the current line=H (H>h). As described previously, the grid (cell) dimension is the same as the dimension of character 24 (i.e. h), so the current line's hmax (hmax=H) is larger than the grid dimension. Therefore the decision result in step S2 is negative and the flow branches to step S3, and the automatic forced grid line spacing procedure in accordance with the invention is executed.

Next the invention's automatic forced grid line spacing procedure will be explained in detail with reference to both FIG. 5 and FIG. 9.

First, the height H of text ("semiconductor device" in this example) to be arranged in the current line in frame 20's grid is determined to be the height of the embox of the largest character in the text (step S11). Furthermore, this step is the same as step S1 in FIG. 4, so if text height H has been determined before entering the FIG. 5 procedure, step S11 can be skipped. Next, starting position Ys for the current line in frame 20 is determined. As shown in FIG. 9A, in this implementation frame 20 has at least one line demarcated by the grid structure and extending horizontally, and each line comprises at least one cell 21. A positive coordinate Y is applied whose value increases heading vertically downward, the coordinate Y having a reference value (for example, "0" in the example shown here) which is the top part (top side) of the uppermost line in frame 20. In addition, in the implementation shown here frame 20 has a spacing (interline spacing) of a specified dimension adjacent to the bottom of the line for text arrangement (except for the bottommost line). Furthermore, the size of cell 21 and the size of the spacing amount can be set by the user to an optional size when creating frame 20 and at an optional time thereafter.

As described previously, starting position Ys for the current line is determined as the bottom position of the previous line's spacing (in this example, the uppermost line in frame 20), as shown in step S12 of FIG. 9A. Next, as shown in the flowchart in FIG. 5, first rectangle 30 (L, R, Ys, Ys+1) is determined from the current line in frame 20 (step S13). That is, the top side of first rectangle 30 is a horizontal line at the position of Ys, and the bottom side is a horizontal line at the position of Ys+H (text height for the current line), and the left side is vertical line L (part of the left side of frame 20 in this example) passing through the edge of the left side of the current line in frame 20, and the right side is vertical line R (part of the right side of frame 20 in this example) passing through the edge of the right side of the current line in frame 20.

Next, a decision is made as to whether or not a grid coordination mode is selected (step S14), and if the decision result is negative the flow branches to step S22 and text is arranged in first rectangle 30 shown in FIG. 9A (step S22). On the other hand, if the decision result in step S14 is affirmative, the selected grid coordination mode GAV is determined (step S15). Furthermore, grid coordination mode GAV regulates the sort of coordination reference used to arrange characters in the grid of frame 20 when arranging characters in frame 20. For example, it regulates whether the top, center, baseline, or bottom of a character embox (or the top, center, or bottom of an ICF box) is coordinated with the grid reference line of frame 20 in arranging characters. Also, in this implementation the grid coordination mode GAV is selected in paragraph units, and the selected GAV is stored at a specified storage location in memory. Therefore, when the user selects a grid coordination mode GAV for a specified paragraph, that GAV is effective for all lines in the paragraph. Furthermore, this implementation assumes that grid coordination mode GAV is selected as the embox center (in different implementations, of course, a different GAV can be selected).

Next, based on the selected grid coordination mode GAV, point Ya in first rectangle 30 is determined. In this implementation, GAV is embox center, so in this case point Ya is the center of first rectangle 30—that is, the center position Ya in the vertical direction between the top side Ys and bottom side Ys+H of the first rectangle 30—and is determined as Ys+H/2. On the other hand, when GAV is embox top, for example, point Ya is set as the first rectangle's top part Ys (that is, in this case Ya=Ys).

Next, a decision is made whether the grid of frame 20 is active (activated status) or not (step S17). If a CJK grid based on cell 21 in frame 20 is not active, or if a grid does not exist, text cannot be coordinated with the grid of frame 20, so the flow branches to baseline processing (step S19), and characters are arranged in frame 20 using a baseline grid (a grid consisting of a plurality of horizontal lines arranged at fixed intervals in order to coordinate characters referenced on a baseline) set in frame 20 by default in accordance with the procedure shown in FIG. 6. That is, in this case, as shown in the FIG. 6 flowchart, the next grid line's (baseline) position Yc is determined in the baseline grid (step S30), and then positional difference DY in the Y direction is determined as DY=Yc−Ya (step S31). Subsequently the processing returns to the flowchart in FIG. 5.

On the other hand, if the frame grid is active, i.e. if a CJK grid based on cell 21 in frame 20 is active, as shown in FIG. 9B second rectangle 31 surrounding the current line and at least one following line (one line in this implementation) is determined, and then point Yb is determined for this second rectangle 31 again based on GAV. That is, in this implementation GAV is the embox center, so second rectangle 31's center position—that is, the point at the position in the center between second rectangle 31's top side Ys and bottom side (the third line in frame 20, i.e. the bottom side of the line adjacent to the bottom of the current line)—is determined as point Yb. Furthermore, in this implementation, when text height H is larger than the grid's line height, the second rectangle is demarcated by adding one other line to the current line, but of course the number of lines to be added to the current line can be set to an optional number in accordance with the forced grid line spacing mode desired by the user (for example, taking two lines, three lines, etc.). In addition, this second rectangle is imaginary, so demarcating the second rectangle itself is not always important in this procedure. If it is possible to obtain the length in the Y direction from Ys according to a desired forced grid line spacing mode and determine point Yb according to the GAV selected for that length, that may be sufficient. For example, when GAV is the embox top, position Ys becomes the reference line for arranging characters, so determining second rectangle 31 is not particularly necessary in order to determine point Yb. Nevertheless, in this case too it is necessary to demarcate second rectangle 31 in order to determine the scope of the desired forced grid line spacing in order to arrange the next line in frame 20, of course.

Next, as shown in FIG. 9B, positional difference DY in the Y direction is determined as DY=Yb−Ya (step S20). Next, as shown in FIG. 9C, first rectangle 30 is moved downward by exactly DY. Next, first rectangle 30' moved to the new position becomes the current line, and one line's worth of characters is arranged therein (step S22). In this way a character string having a character 25 that is larger than the grid dimension of frame 20 is positioned and arranged in the center of a space demarcated by two lines (and the spacing region between them) in a two forced grid line spacing configuration in this implementation.

In addition, the remaining characters 24 in the paragraph are all the same size as frame 20's grid dimension, so these remaining characters 24 are sequentially arranged in the last line of frame 20. FIG. 10 shows the final result.

As described above, when the maximum dimension of a plurality of characters being arranged in the current line of frame 20 exceeds the grid dimension, the invention automatically executes forced grid line spacing for exactly the number of lines preselected or set, and makes it possible to arrange characters in a space demarcated by a plurality of lines with forced grid line spacing and a specified coordination mode. Therefore it is not necessary for the user to perform manual operations or complicated setting operations in order to execute forced grid line spacing, and typesetting operations can be performed extremely efficiently.

Potential advantages of the invention in accordance with one or more of the implementations described above may include the following. The invention may eliminate the conventional setting technique described above and may provide a typesetting technology provided with a forced grid line spacing control function that can automatically and swiftly perform forced grid line spacing even of text consisting of a plurality of characters with differing fonts or dimensions. The invention may provide a forced grid line spacing technology such that when the height of text consisting of a plurality of characters to be arranged within one line of a grid displayed on a display device is larger than the grid dimension, a plurality of lines can be selected and an arrangement region can be demarcated, and the reference point of a plurality of characters can be coordinated with the reference point of the arrangement region and the characters can be arranged in the arrangement region according to a preselected coordination mode. The invention may provide a DTP system that provides an improved forced grid line spacing control function. The invention may provide a forced grid line spacing control method that can be executed by a computer. The invention may provide a computer-readable recording medium storing an improved forced grid line spacing control program.

A number of implementations of the invention have been described. Nevertheless, it will be understood that various modifications may be made without departing from the spirit and scope of the invention. Accordingly, other implementations are within the scope of the following claims.

What is claimed is:

1. A computer program product, stored on a computer-readable recording medium, comprising instructions operable to cause a programmable processor to:
    determine the height of text consisting of a plurality of characters to be arranged within a current line in a grid displayed on a display device, the grid comprising a plurality of grid lines, each grid line including a plurality of cells for arranging characters within the grid line according to a particular coordination mode;
    when the height of the text is larger than a specified dimension for the grid, demarcate an arrangement region that includes the current line and at least one subsequent line in the grid, where the arrangement region defines a new line with respect to the grid for arranging the plurality of characters;
    set a coordination line for the arrangement region according to a selected coordination mode;
    arrange the plurality of characters within the arrangement region while coordinating the plurality of characters with the coordination line; and
    displaying the arranged plurality of characters.

2. The product of claim 1, wherein the grid is a frame grid that is movable to a desired position on a page of an electronic document displayed on the display device in order to arrange data to be typeset on the page, the grid having a plurality of lines, each line comprising a plurality of cells.

3. The product of claim 2, wherein the grid is a CJK character grid.

4. The product of claim 1, wherein the specified dimension of the grid is a font point dimension selected when the grid is created by the user on the display device.

5. The product of claim 1, wherein the coordination mode comprises at least one of a top coordination mode, a midpoint coordination mode, a baseline coordination mode, or a bottom coordination mode.

6. The product of claim 1, wherein each character in the plurality of characters has an associated embox and the maximum dimension of the current line is a height dimension of the largest embox associated with the plurality of characters.

7. The product of claim 6, wherein the embox vertically and horizontally delimits the point dimensions of each character and is an essentially square frame surrounding the character glyph.

8. The system of claim 1, where the coordination mode comprises at least one of a top coordination mode, a midpoint coordination mode, a baseline coordination mode, or a bottom coordination mode.

9. The system of claim 1, where each character in the plurality of characters has an associated embox and the maximum dimension of the current line is a height dimension of the largest embox associated with the plurality of characters.

10. A method for controlling forced grid line spacing, comprising:
    determining the height of text that includes a plurality of characters to be arranged within a current line in a grid displayed on a display device, the grid comprising a plurality of grid lines, each grid line including a plurality of cells for arranging characters within the grid line according to a particular coordination mode;
    when the height of the text is larger than a specified dimension for the grid, demarcating an arrangement region that includes the current line and at least one subsequent line in the grid, where the arrangement region defines a new line with respect to the grid for arranging the plurality of characters;
    setting a coordination line for the arrangement region according to a selected coordination mode;
    arranging the plurality of characters within the arrangement region while coordinating the plurality of characters with the coordination line; and
    displaying the arranged plurality of characters.

11. The method of claim 10, wherein the grid is a frame grid that is movable to a desired position on a page of an electronic document displayed on the display device in order to arrange data to be typeset on the page, the grid having a plurality of lines, each line comprising a plurality of cells.

12. The method of claim 11, wherein the grid is a CJK character grid.

13. The method of claim 10, wherein the specified dimension of the grid is a font point dimension selected when the grid is created by the user on the display device.

14. The method of claim 10, wherein the coordination mode comprises at least one of a top coordination mode, a midpoint coordination mode, a baseline coordination mode, or a bottom coordination mode.

15. The method of claim 10, wherein each character in the plurality of characters has an associated embox and the maximum dimension of the current line is a height dimension of the largest embox associated with the plurality of characters.

16. The method of claim 15, wherein the embox vertically and horizontally delimits the point dimensions of each character and is a substantially square frame surrounding the character glyph.

17. A desktop publishing system for controlling forced grid line spacing, comprising:
    a desktop publishing processing control device provided with a font file, the font file storing character font information for performing typesetting, and with typesetting control means having a control means for forced grid line spacing;
    a display device displaying data being typeset; and
    input means for user input;
    the control means for forced grid line spacing being arranged to:
    determine whether a maximum dimension of a plurality of characters to be arranged according to a selected coordination mode within a current line of a grid displayed on the display device exceeds a specified dimension of the grid, the grid comprising a plurality of grid lines, each grid line including a plurality of cells for arranging characters within the grid line according to a particular coordination mode; and
    when the maximum dimension of the plurality of characters exceeds the specified dimension:
        select a plurality of grid lines including a current grid line and at least one subsequent grid line as an arrangement space, where the arrangement space defines a new line with respect to the grid for arranging the plurality of characters; and
        arrange the plurality of characters within the arrangement space, based on the coordination mode.

18. The system of claim 17, where the grid is a frame grid that is movable to a desired position on a page of an electronic document displayed on the display device in order to arrange data to be typeset on the page, the grid having a plurality of lines, each line comprising a plurality of cells.

19. A method for controlling forced grid line spacing, comprising:
    determining whether a maximum dimension of a plurality of characters to be arranged according to a selected coordination mode within a current line of a grid displayed on a display device exceeds a specified dimension of the grid, the grid comprising a plurality of grid lines, each grid line including a plurality of cells for arranging characters within the grid line according to a particular coordination mode; and
    when the maximum dimension exceeds a specified dimension of the grid:
        selecting a plurality of grid lines including a current grid line and at least one subsequent grid line as an arrangement space, where the arrangement space defines a new line with respect to the grid for arranging the plurality of characters; and
        arranging the plurality of characters within the arrangement space, based on the selected coordination mode.

* * * * *